United States Patent
Block

(10) Patent No.: US 7,536,312 B2
(45) Date of Patent: May 19, 2009

(54) METHOD OF APPRAISING AND INSURING INTELLECTUAL PROPERTY

(75) Inventor: Robert Block, Chicago, IL (US)

(73) Assignee: Ocean Tomo, LLC, Chicago, IL (US)

( * ) Notice: Subject to any disclaimer, the term of this patent is extended or adjusted under 35 U.S.C. 154(b) by 441 days.

(21) Appl. No.: 11/342,330

(22) Filed: Jan. 26, 2006

(65) Prior Publication Data

US 2006/0218066 A1    Sep. 28, 2006

Related U.S. Application Data

(60) Provisional application No. 60/647,577, filed on Jan. 26, 2005.

(51) Int. Cl.
  *G06F 9/44*    (2006.01)
(52) U.S. Cl. .................. 705/7; 705/1; 705/35; 705/38; 707/1; 707/100
(58) Field of Classification Search ..................... 705/1, 705/7, 35, 38; 707/1, 6, 100; 708/130, 131, 708/134
  See application file for complete search history.

(56) References Cited

U.S. PATENT DOCUMENTS

| | | | |
|---|---|---|---|
| 6,556,992 B1 * | 4/2003 | Barney et al. ................. | 707/6 |
| 2004/0010393 A1 | 1/2004 | Barney | |
| 2006/0064367 A1 | 3/2006 | Block et al. | |
| 2007/0073748 A1 | 3/2007 | Barney | |
| 2007/0226094 A1 | 9/2007 | Malackowski et al. | |

OTHER PUBLICATIONS

Rules for Managing IP after Enron by Stacey Rabbino, Managing Intellectual Property; Nov. 2003 Issue 134, p. 62-64.*
Alfred M. King's article Valuing Intangible Assets through Appraisals, Strategic Finance, Nov. 1999, p. 32, retrieved from Proquest Oct. 24, 2008.*
U.S. Appl. No. 10/425,554, Not yet published, Barney.

* cited by examiner

*Primary Examiner*—Mary Cheung
*Assistant Examiner*—Brian Fertig
(74) *Attorney, Agent, or Firm*—Knobbe, Martens, Olson & Bear LLP

(57) ABSTRACT

Methods are disclosed for using computers, computer programs, algorithms and computer networks and communications hardware and protocols to appraise the value of assets as well as protecting asset owners from the risk that other entities will value those assets differently. The methods disclosed include:

Supplementing traditional valuation methods with other considerations that may affect the value of intellectual property assets.

Using insurance type financial instruments to maintain compliance with regulatory requirements such as those imposed by the Sarbanes Oxley Act, the SEC, or the IRS.

Using insurance type financial instruments to protect intellectual property asset owners from the risk that tribunals, regulatory agencies, or other entities will appraise intellectual property assets at a different value.

4 Claims, 1 Drawing Sheet

METHOD OF APPRAISING AND INSURING INTELLECTUAL PROPERTY

CROSS-REFERENCE TO RELATED APPLICATIONS

This application claims the benefit of U.S. Provisional Patent Application Ser. No. 60/647,577 filed on Jan. 26, 2005, the entire contents of which are hereby incorporated herein by reference.

FIELD OF THE INVENTION

The invention in various embodiments relates to the use of computers, computer programs and computer algorithms, as well as computer communication devices and protocols, to appraise the value of assets as well as protecting various individuals from the risk that other entities will value those assets differently.

BACKGROUND OF THE INVENTION

The valuation of intellectual property assets may create exposure to risk from multiple sources. Various tribunals and agencies may value intellectual property differently, creating substantial risk for intellectual property owners. Valuing intellectual property may also create compliance issues based on requirements from regulatory bodies.

For example, the Sarbanes Oxley Act of 2002 creates specific duties of corporate officers that may create liabilities if breached. Although professional liability insurance has been used to protect officers from liability, this insurance does not signal the quality of any company asset or accuracy of any specific management decision. Further, by their very nature and structure, such policies cover a range of "wrongful acts" subject to myriad exclusions and exceptions.

Financial guarantees, which are predictions of future value, have been used to act as collateral for loan transactions involving intellectual property. But these are only operational at the time the collateral is repossessed if the intellectual property owner defaults on the loan. Further, insurance policies that utilize bonding instruments have been used to validate valuation assumptions, but they have been limited to valuing tangible assets.

SUMMARY OF THE INVENTION

One embodiment of the invention is a computer tool to establish the premium for an intellectual property valuation/appraisal risk policy using traditional valuation methodologies, and then further considering (1) the Sarbanes-Oxley Act of 2002 and any related legislation, rules, guidance, etc., and/or other regulatory requirements in general, and/or (2) the contents of file wrappers associated with the patented assets considered in the appraisal.

In one embodiment, the invention utilizes an intellectual property valuation bond to both transfer and mitigate the policy holder's financial risk that a government agency or tribunal may accept a smaller value for the subject intellectual property in place of the appraised value. Preferably, the bond will exclude fluctuations in value due to exogenous events such as product obsolescence or a finding of patent invalidity. However, the fact that an unrelated third-party, namely the valuation bond underwriter, has committed risk capital to support the valuation should be persuasive to agencies and tribunals that often look to arms-length market transactions to determine reasonable value. Such transactions are often lacking for IP, and the valuation bond utilized in one preferred embodiment can serve as a corrective.

For example, a global corporation is obliged to make transfer pricing decisions in connection with illiquid intellectual property that have the potential to impact taxable income through multiple jurisdictions. Preferably, the valuation bond would respond in cases where a taxing authority successfully argued that the appraised intellectual property was overvalued and taxable income was thus understated in jurisdictions where subsidiaries paid and deducted transfer pricing royalties based on the erroneous higher valuation.

One embodiment of the invention comprises three main steps:

Step 1—Perform a traditional intellectual property valuation. The methodologies used to appraise intellectual property are well established and commonly used. The output of a traditional valuation is defined as [A].

Step 2—Enhanced intellectual property valuation. Preferably, the novel components of the enhanced appraisal are consideration of the Sarbanes-Oxley Act and the patent file wrappers. The output of the factors included in Step 2 are defined as [B] and [C].

Step 3—Use the outputs of Steps 1 & 2 to determine the risk policy premium, defined as [D], where [D]=function ([A]+[B]+[C]). Alternative embodiments may not include all of these steps. It is contemplated that step 2 may utilize the patent file wrapper to appraise a patent with or without the traditional valuation methods of step 1 and with or without considering the Sarbanes-Oxley Act. Additionally, further embodiments may factor compliance risks related to the Sarbanes-Oxley Act into the risk policy premium without other valuation considerations.

DETAILED DESCRIPTION OF A PREFERRED EMBODIMENT

Figure 1:
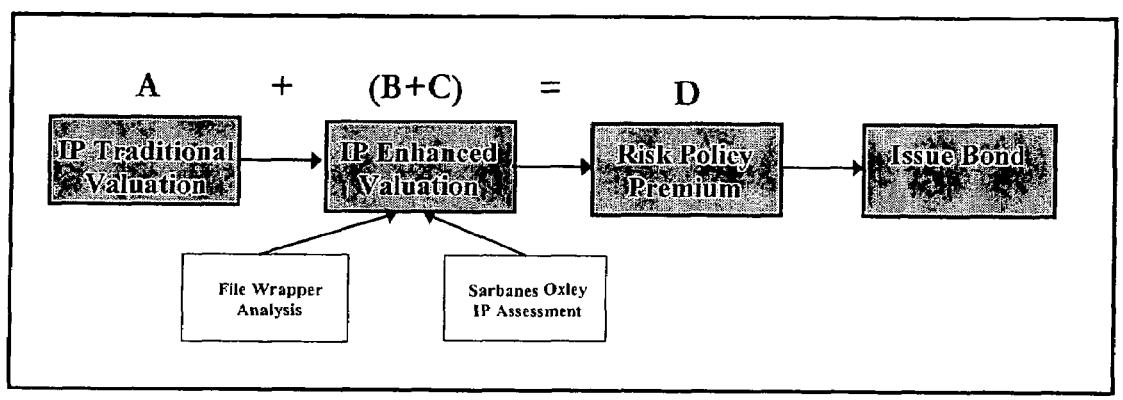
FIG. 1 is a flow chart illustrating one embodiment of an appraisal system as described herein.

In one embodiment of this invention, a computer algorithm is used to insure and reflect the value of intellectual property assets. However, it is contemplated that alternative embodiments may be applicable to tangible assets.

Step 1 of a Preferred Embodiment—Traditional Intellectual Property Valuation Intellectual property valuation techniques referred to herein as traditional have been used by practitioners for many years, and are well documented in numerous books and other publications.

One goal of one embodiment of the appraisal process is to develop a well-supported estimate of value based on consideration of pertinent data. There are numerous methodologies that may be appropriate to the economic analysis of intellectual property, any of which may be utilized to perform the appraisal in this embodiment. However, when analysts consider the fundamental similarities and differences among these methods and procedures, they often logically group together into the three general categories of valuation analysis. These three fundamental ways to value intellectual property are commonly called the Cost Approach, the Market Approach, and the Income Approach. The Cost Approach is based upon the principles of asset recreation or substitution.

These basic economic principles assert that an investor will pay no more for an investment than its cost (e.g., its reproduction or replacement cost). The Market Approach is based upon market-derived empirical transactional data and an assessment of the changes in market conditions between the date of the transactions and the date of the appraisal. The Income Approach is based upon the principle of the Net Present Value of future cash flows. In the Income Approach, the asset value is the present value of the expected economic income expected to be earned from asset ownership.

Preferably, one embodiment of the invention utilizes the similar steps used in the various traditional intellectual value appraisal methods, which may comprise:

1. Identification of the intellectual property appraisal problem, which may include but is not limited to:
   a. Identification of the subject asset.
   b. Identification of the subject asset rights to be valued.
   c. Objective of the appraisal assignment.
   d. Purpose of the appraisal assignment.
   e. Definition of the appropriate standard of value.
   f. Date of the value estimate.
   g. A listing of limiting conditions.
2. Data collection and analysis, which may include but is not limited to:
   a. Characteristics of the asset: ownership interest to be valued, rights, privileges, conditions, and factors affecting ownership or operational control.
   b. Nature, history, outlook and competitive landscape of the business and industry in which the asset operates.
   c. Historical financial information for the asset.
   d. Related assets and liabilities required for economic operation of the subject assets.
   e. The nature and conditions of the relevant industries that have an impact on the asset.
   f. Local, national, and international economic factors affecting the asset.
   g. Available rates of return on alternative market investments and a description of relevant market transactions.
   h. Prior transactions involving the subject and related subject assets.
   i. Other relevant information.
3. One embodiment of the invention may use one or more of the following valuation approaches. Other embodiments may use a method other than those listed below.
   a. Cost Approach
      Within the Cost Approach, there are several related analytical methods. Each group of analytic methods uses a similar definition of the type of cost that is relevant to the valuation. The most common types or definitions of cost are: reproduction cost and replacement cost. Preferably, Cost Approach valuations methods involve a comprehensive analysis of the relevant cost components. Definitions of cost may include but are not limited to considerations of the following cost components:
      Materials
      Labor
      Overhead
      Asset developer's profit
      Entrepreneurial incentive
   b. Market Approach
      There is a general systematic process or framework to the application of the Market Approach. The basic steps of this general systematic process may include but are not limited to:
      Data collection and selection.
      Classification of selected data.
      Verification of selected data.
      Selections of units of comparison.
      Quantification of pricing multiples.
      Adjustment of pricing multiples.
      Application of pricing multiples.
      Reconciliation of value indications.
   c. Income Approach
      A preferred embodiment of the invention may use the Income Approach to appraise the value of an asset by using the present value of the expected economic income to be earned from ownership of the asset. The investor anticipates the expected economic income to be earned from the investment in the subject asset. This expectation of prospective economic income may be converted to a present value or worth. Preferably, in this valuation approach, the analyst estimates the investor's required rate of return on the investment generating the prospective economic income. The required rate of return may be a function of the risk or uncertainty of the expected economic income associated with the asset. The basic steps of this approach may include but are not limited to:
      Forecast the appropriate measure of economic income enabled by the asset into the future.
      Convert the projection of prospective economic income into a present value by the use of a present value discount rate.
      Specific activities undertaken to accomplish the above two steps include, but are not limited to the following:
      1. Assess subject patents and competitive patents by:
         a. Reviewing patents and patent applications;
         b. Interviewing people knowledgeable of pertinent patents;
         c. Rating the pertinent patents; and
         d. Performing a patent landscape analysis.
      2. Assess the uses and advantages/disadvantages of the IP versus alternatives;
      3. Assess the economic costs and benefits of implementing the IP versus alternatives;
      4. Assess the competitive IP; and
      5. Assess the size of the markets in which the IP can be used
      6. Forecast the IP's penetration into the market
      7. Forecast the timing of IP commercialization
      8. Forecast the IP's useful economic and legal life
      9. Estimate the probabilities of technical and market success by:
         a. Reviewing pertinent information provided by the IP owner
         b. Interviewing people knowledgeable about the IP
         c. Performing independent market research
         d. Hiring third-party industry and technology experts
         e. Performing primary market research
         f. Researching transactional data for similar IP
      10. Determine the appropriate discount rate
      11. Develop a financial model incorporating or representing the above detailed aspects
      12. Incorporate Monte Carlo, Decision Tree, or Black Scholes advanced modeling techniques
4. Estimation of the value conclusion, which may include but is not limited to:
   a. The value estimate.
   b. Identification of the subject assets.
   c. The objective of the appraisal.
   d. The purpose of the appraisal.
   e. The asset ownership interest subject to appraisal.

f. The date of the value estimate.

g. Definition of the appropriate standard of value to be estimated.

h. The premise of value to be used.

Step 2—Enhanced Intellectual Property Valuation

One embodiment of the invention provides an enhanced intellectual property valuation by considering the affects of (1) the Sarbanes-Oxley Act of 2002 and any related legislation, rules, guidance, etc. and (2) the contents of patent file wrappers on a traditional valuation. Preferably, these two factors are considered in addition to the traditional factors discussed above.

1. Assess Impact of the Sarbanes-Oxley Act of 2002 and Any Related Associated Legislation, Rules, Guidance One embodiment of the invention includes a computer algorithm to establish the premium, limits, and structure of an insurance policy that facilitates compliance with the Sarbanes Oxley Act of 2002 ("the Act") by protecting shareholders against the consequences of any error, omission or misstatement in connection with the company's statement of intellectual property value including certification under Sections 302 and 404 of the Act.

Section 302 of the Act requires the CFO and CEO of public companies to certify that their annual and quarterly reports do not contain any untrue statement of material fact or fail to disclose a material fact as well as to certify that the information presented "fairly presents in all material respects the financial position of the issuer". Section 404 of the Act requires companies to certify their internal controls including the procedures and protocols by which they assess business risks (including, for many companies, risks arising out of intellectual property exposures).

The threshold problem for companies with significant intellectual property (especially patent) portfolios is that such properties may be valuable but illiquid. The absence of a ready market for the sale or other disposition of such properties complicates certification without a demonstrable counter-party capital commitment.

Certain Director's & Officer's policies or Professional Liability policies can respond to damage claims arising out of material misstatements. However, by their very nature and structure, such policies cover a range of "wrongful acts" subject to myriad exclusions and exceptions. Professional Liability insurance is not customarily underwritten or understood to signal the quality of any company asset or the accuracy of any specific management representation. D&O policies also are written to contest claims on behalf of defendants and not for the benefit of obligees who have been harmed by the wrongful acts at issue.

What is needed is a mechanism that can confer transparency and market discipline on illiquid intellectual property assets without compromising value or control. A properly designed and priced insurance policy, which may be utilized in one embodiment of the invention, can support valuation assumptions with third-party capital without diluting title or clouding ownership of the intellectual property assets. Preferably, regulators, shareholders, creditors and other company constituents can rely on the specific and direct commitment of the insurer's financial resources to support statements about intellectual property value and related financial controls.

The insurance policy or product design that is typically most efficient in validating valuation assumptions is a bonding instrument. Bonds utilize relatively simple forms that provide fewer conditions to payment. Bonds have historically been utilized in connection with tangible assets with the most common example being contractors' bonds. Bonds have not historically been utilized in connection with the valuation of intellectual property. Financial guarantees, which are predictions of future value, have been underwritten in support of loan transactions for intellectual property utilized as collateral therein. But such financial guarantees are, by definition, only operational at the time collateral is repossessed. They, only afford protection when the intellectual property owner defaults on the loan and the lender takes over (and attempts to liquidate) the collateral. To offer meaningful protection against Sarbanes Oxley compliance risk, or the tax risks associated with transfer pricing, what is needed is an instrument, such as the type described in one embodiment of this invention, with the flexibility and straightforwardness of a surety bond that can confer benefits without requiring alienation or sale of the intellectual property that is the subject of the bonded valuation.

In a preferred embodiment of the invention, a valuation bond supports a covered intellectual property valuation subject only to the condition that it would be void in the event of actual fraud by the insured. Preferably, claim payments would be triggered by a finding on the part of a regulator or tribunal that the bonded valuation had materially overstated the value of the intellectual property at issue based on the facts then known by the valuation professionals. In one embodiment, the bond underwriter would take counterparty risk based on the value of the intellectual property at issue that is not distinguishable in principle from the position of a buyer since the buyer of intellectual property typically risks capital based on valuation assumptions subject only to a right of rescission in the event of fraud. If the economics of the bond converge with the economics of a sale, the bond can be reasonably seen as the equivalent of a sale for purpose of demonstrating market price, even though, in one embodiment, the intellectual property owner is not obliged to part with title or control to the bonded intellectual property. This will be especially helpful in cases where regulatory authorities look to market value by statute or treaty. Transfer pricing is one area where international competent authorities have agreed to look to market value. The valuation bond of one preferred embodiment can signal market value in cases where intellectual property is of the type infrequently traded or exchanged.

2. Analyze the Contents of Patent File Wrappers

One preferred embodiment of the invention is to make patent file wrappers a factor in assessing a patent's value. The information contained in a patent file wrapper can be analyzed to obtain multiple factors affecting the patent's value. Such factors may include but are not limited to the amount and/or weight of estoppel created during prosecution of the patent, the completeness of the prior art cited by the patent applicant, and any other factors that may raise questions about the validity of the claims, or that may cause the enforceable scope of the patent to be reduced or limited.

In general, estoppel is created whenever an applicant amends the claims of a patent application or makes any statements describing the scope of the claims. Such statements can be in the form of arguments made with the intent of distinguishing an invention from a prior art reference, or they may occur as general statements about what the scope of one or more claims. In some situations, estoppel can also be created when an applicant fails to refute statements made by the Examiner, thereby implying tacit agreement with those statements.

In one embodiment of the invention, the completeness of the prior art cited by the applicant can be determined by compiling information that may be material to the patentability of the patent and that the applicant was aware of during prosecution of the application. Such information may include but is not limited to patent literature, articles printed in periodicals, or other information in the possession of the patent applicant during the pendency of the patent.

A preferred embodiment of the invention utilizes a computer model (e.g. an algorithm or computer process flow) to aggregate and weight the above factors and any other information found in the file history that would potentially have a positive or negative affect on the validity, enforceability, or scope of the patent to create a positive or negative weighting score which can be used in the appraisal of the patent's value.

Step 3—Use Steps 1 & 2 to Determine Risk Policy Premium

One embodiment of the invention may use a computer to calculate the risk policy premium based on the computer output results of step 1 (traditional intellectual property valuation) defined as [A], and the computer output results of Step 2 (enhanced intellectual property valuation) defined as [B] and [C]. Preferably, the risk policy premium is defined as [D], where [D]=function ([A]+[B]+[C]).

In a preferred embodiment of the invention, the risk policy premium is then incorporated into a computer model of relevant stochastic events establishing a loss probability distribution, defined as [D]. Preferably, the loss probability distribution is then utilized to determine optimal structures including: [D1] policy limits; [D2] policy retentions and retention structures; [D3] conditions & exclusions; [D4] risk premium and [D5] optimal reinsurance and coinsurance levels.

Alternative embodiments may not include all of these steps. It is contemplated that step 2 may utilize the patent file wrappers to appraise a patent without considering the Sarbanes Oxley Act. Additionally, further embodiments may factor compliance risks, such as those associated with the Sarbanes-Oxley Act, into the risk policy premium without other valuation considerations. Alternatively, in some embodiments an intellectual property valuation bond may be used to secure a value of an intellectual asset against disapproval of a product by a government agency such as the FDA, US Department of Defense or other regulatory agency that may prevent the release of a product to market.

Unless indicated otherwise, it may be assumed that the process steps described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A computer implemented method to appraise a value of an intellectual property asset and to insure against risks related to the value of the intellectual property asset, the method comprising:

electronically receiving in a computer an appraisal on the intellectual property asset using traditional valuation methods, the traditional valuation methods comprising at least one of a cost approach, a market approach, or an income approach;

electronically calculating in the computer an adjusted appraisal by adjusting the appraisal based on information that is not considered in traditional valuation methods, the information comprising at least one: a word count of the file wrapper of the intellectual property asset, or a count of the number of errors, omissions, or misstatements in connection with a statement of intellectual property value;

electronically calculating in the computer a risk policy premium based on the adjusted appraisal for a risk policy that protects against risks related to the value of the intellectual property asset; and electronically issuing by the computer a valuation bond on the intellectual property asset to transfer and mitigate said risks related to the value of the intellectual property asset, wherein claim payments of the valuation bond are triggered by a finding on the part of a regulator or tribunal, wherein the finding is an adverse outcome that finds that the adjusted appraisal had materially overstated the value of the intellectual property asset.

2. The computer implemented method of claim 1, wherein the computer comprises a plurality of computers connected via a network.

3. A computer-readable medium to appraise a value of an intellectual property asset and to insure against risks related to the value of the intellectual property asset, the computer-readable medium having computer-executable instructions for performing a method comprising:

receiving an appraisal on the intellectual property asset using traditional valuation methods, the traditional valuation methods comprising at least one of a cost approach, a market approach, or an income approach;

calculating an adjusted appraisal by adjusting the appraisal based on information that is not considered in traditional valuation methods, the information comprising at least one: a word count of the file wrapper of the intellectual property asset, or a count of the number of errors, omissions, or misstatements in connection with a statement of intellectual property value;

calculating in the computer a risk policy premium based on the adjusted appraisal for a risk policy that protects against risks related to the value of the intellectual property asset; and issuing a valuation bond on the intellectual property asset to transfer and mitigate said risks related to the value of the intellectual property asset, wherein claim payments of the valuation bond are triggered by a finding on the part of a regulator or tribunal, wherein the finding is an adverse outcome that finds that the adjusted appraisal had materially overstated the value of the intellectual property asset.

4. A computer system programmed to appraise a value of an intellectual property asset and to insure against risks related to the value of the intellectual property asset, the computer system comprising:

a central processing unit programmed to:

receiving an appraisal on the intellectual property asset using traditional valuation methods, the traditional valuation methods comprising at least one of a cost approach, a market approach, or an income approach;

calculating an adjusted appraisal by adjusting the appraisal based on information that is not considered in traditional valuation methods, the information comprising at least one: a word count of the file wrapper of the intellectual property asset, or a count of the number of errors, omissions, or misstatements in connection with a statement of intellectual property value;

calculating a risk policy premium based on the adjusted appraisal for a risk policy that protects against risks related to the value of the intellectual property asset; and issuing a valuation bond on the intellectual property asset to transfer and mitigate said risks related to the value of the intellectual property asset, wherein claim payments of the valuation bond are triggered by a finding on the part of a regulator or tribunal, wherein the finding is an adverse outcome that finds that the adjusted appraisal had materially overstated the value of the intellectual property asset; and a memory to store program code executed by the central processing unit.

* * * * *